12) United States Patent
Miyahara et al.

(10) Patent No.: US 7,470,081 B2
(45) Date of Patent: Dec. 30, 2008

(54) JOINT STRUCTURE BETWEEN MEMBERS (75) Inventors: Yutaka Miyahara, Hiroshima (JP);
Tatsuzo Hashimoto, Hiroshima (JP);
Ryou Aoki, Kanagawa (JP); Oomi Arisaka, Kanagawa (JP)

(73) Assignees: Daikyonishikawa Corporation (JP);
Piolax Inc. (JP)

( * ) Notice: Subject to any disclaimer, the term of this patent is extended or adjusted under 35 U.S.C. 154(b) by 226 days.

(21) Appl. No.: 11/116,212

(22) Filed: Apr. 28, 2005

(65) Prior Publication Data
US 2005/0249549 A1 Nov. 10, 2005

(30) Foreign Application Priority Data
May 10, 2004 (JP) .............................. 2004-139440

(51) Int. Cl.
*F16C 11/06* (2006.01)
*F16D 1/00* (2006.01)

(52) U.S. Cl. ........................... 403/221; 403/6; 403/225; 403/361; 403/365; 123/195 C (58) Field of Classification Search ................ 403/361, 403/365, 367, 372, 329, DIG. 14, 6, 167, 403/168, 221, 223, 90, 38, 225, 227, 7, 67; 123/195 C, 198, 198 R
See application file for complete search history.

(56) References Cited

U.S. PATENT DOCUMENTS

| 1,862,153 | A | * | 6/1932 | Lee | .............................. 285/231 |
| 2,560,644 | A | * | 7/1951 | Hartzell | ......................... 464/75 |
| 2,638,761 | A | * | 5/1953 | Henry | .......................... 464/89 |
| 2,727,368 | A | * | 12/1955 | Morton | ......................... 464/89 |
| 2,973,213 | A | * | 2/1961 | Moskovitz | ................... 403/227 |
| 3,118,204 | A | * | 1/1964 | Bixby | ........................ 209/233 |
| 3,303,669 | A | * | 2/1967 | Oetiker | ......................... 464/88 |
| 3,385,301 | A | * | 5/1968 | Harautuneian | ........... 604/99.03 |
| 4,585,369 | A | * | 4/1986 | Manesse et al. | .......... 403/322.3 |
| 4,764,152 | A | * | 8/1988 | Jorg et al. | ...................... 464/89 |
| 4,826,230 | A | * | 5/1989 | Truchet | ........................ 294/88 |
| 5,143,469 | A | * | 9/1992 | Cadeddu | ..................... 403/133 |

(Continued)

FOREIGN PATENT DOCUMENTS

FR        2616474        12/1988

(Continued)

*Primary Examiner*—Daniel P Stodola
*Assistant Examiner*—Nahid Amiri
(74) *Attorney, Agent, or Firm*—Studebaker & Brackett PC; Donald R. Studebaker (57) ABSTRACT A first annular frame is formed on the bottom surface of an engine cover. A mount rubber of columnar shape is inserted into the first annular frame. Projections of the mount rubber are fitted into holes of the first annular frame. A through hole is formed in the mount rubber. An engagement projection is formed on the inner surface of the through hole. An adapter has a small-diameter part formed in the vicinity of the top end and a predetermined distance away from the top end toward the root thereof. The adapter has a flange formed below the smaller-diameter part. The top end part of the adapter is inserted into the through hole of the mount rubber to fit the engagement projection into the small-diameter part and bring the flange into abutment on the bottom surface of the mount rubber.

9 Claims, 12 Drawing Sheets

U.S. PATENT DOCUMENTS

| | | | | |
|---|---|---|---|---|
| 5,201,545 | A | * | 4/1993 | Boersma .................... 280/777 |
| 6,206,604 | B1 | | 3/2001 | Dembowsky et al. |
| 6,446,541 | B1 | * | 9/2002 | Eriksson ..................... 92/140 |
| 6,626,379 | B1 | * | 9/2003 | Ritsche et al. ............. 239/337 |
| 6,854,917 | B2 | * | 2/2005 | Kraine et al. .............. 403/120 |
| 2005/0076484 | A1 | * | 4/2005 | Sussenbach et al. ........... 24/662 |
| 2005/0217634 | A1 | * | 10/2005 | Nonogaki et al. |

FOREIGN PATENT DOCUMENTS

JP        2003-090196        3/2003

* cited by examiner

JOINT STRUCTURE BETWEEN MEMBERS

CROSS-REFERENCES TO RELATED APPLICATIONS

This application claims priority under 35 USC 119 to Japanese Patent Application No. 2004-139440, filed on May 10, 2004, the entire contents of which are incorporated herein by reference.

BACKGROUND OF THE INVENTION (a) Field of the Invention

This invention relates to a joint structure between members for joining two members together.

(b) Description of the Related Art

As an example of known joint structures for joining two members together, U.S. Pat. No. 6,206,604 (hereinafter, referred to as Patent Document 1) discloses a joint structure between members in which a first member formed to cover a vehicle engine from above is joined to the engine. In the disclosed joint structure, the first member is releasably joined to a second member fixed to the top of the engine and formed in an upwardly extending column. A rubber elastic member is interposed between the first and second members. The elastic member reduces engine vibrations transmitted to the first member.

The elastic member has a cylindrical shape the central axis of which runs vertically, and is accommodated and held in an annular frame formed on the bottom surface of the first member. A tapered hole is formed in the bottom surface of the elastic member to receive a spherical part formed at the top end of the second member. The elastic member has a holding part formed just above the tapered hole. The holding part fits on and holds the spherical part of the second member inserted therein through the tapered hole. The holding part is contiguous with the tapered hole.

The holding part of the elastic member in Patent Document 1 is formed in a substantially spherical shape to cover the spherical part of the second member from its top end to the vicinity of its bottom end. The holding part formed in a substantially spherical shape provides the following effects. First, even if a force is applied which tends to further move the second member relative to the first member in the direction of insertion of the second member with the spherical part of the second member held in the holding part, the top end of the second member is lodged on the top end portion of the holding part to restrain further movement of the second member in the direction of insertion. Second, even if a force is applied which tends to move the second member in the direction of extraction from the elastic member, the lower portion of the spherical part of the second member is lodged in the lower portion of the holding part to prevent easy extraction of the second member. In this manner, the first member can be held in a fixed position.

In molding an elastic member of cylindrical shape having a hole open at its end surface as in Patent Document 1, use is generally made of a mold that is joined and separated in the direction of a central axis of the elastic member.

SUMMARY OF THE INVENTION

Particularly when the holding part of the elastic member has a spherical shape as in Patent Document 1, the inside diameter of the holding part gradually decreases from the vertical middle position thereof toward the hole, i.e., downward. If the elastic member of Patent Document 1 is molded using a mold that is vertically joined and separated, an undercut will be formed inside of the holding part. Therefore, in order to allow the removal of the molded elastic member from the mold, a slide core must be employed as part of the mold corresponding to the holding part. This increases the mold cost and makes it difficult to reduce the production cost of the elastic member.

The present invention has been made in view of the foregoing point and therefore its object is to allow the elastic member for joining the first and second members therethrough to be easily molded without any undercut being formed, thereby reducing the production cost of the elastic member.

To attain the above object, an embodiment of a first aspect of the invention is directed to a joint structure between members in which an elastic member is inserted and held in an annular frame provided on a first member and the first member is joined to a second member of columnar shape through the elastic member by inserting a distal end part of the second member into the elastic member. Further, the distal end part of the second member has a small-diameter part a predetermined distance away from the distal end toward the root thereof and a flange closer to the root than the small-diameter part and extending radially outward, the elastic member has a through hole extending in the direction of insertion of the second member and an engagement projection projecting from the inner surface of the through hole, and the joint structure is so constructed that the first and second members are joined together by inserting and holding the elastic member in the annular frame and inserting the distal end part of the second member into the through hole of the elastic member to fit the engagement projection into the small-diameter part and bring the flange into abutment on the end surface of the elastic member located toward the root of the second member.

With the above structure, when the second member is inserted into the through hole of the elastic member inserted and held in the annular frame of the first member, the engagement projection on the inner surface of the through hole is fitted into the small-diameter part of the second member to restrain the extraction of the second member and concurrently the flange of the second member abuts on the end surface of the elastic member located toward the root of the second member to block further movement of the second member in the direction of insertion. In this manner, the first and second members are joined together. Further, when the first member holding the elastic member is relatively pulled with a force exceeding a certain limit in the direction of its withdrawal from the second member, the elastic member is deformed so that the engagement projection is disengaged from the small-diameter part. Thus, the first and second members are separated from each other.

Therefore, the first and second members can be detachably joined, not in a way that the elastic member has a shape with an undercut that would be formed where holding the distal end part of the second member to wrap it spherically like in the related art but in a way that it has a through hole. As a result, the production cost of the elastic member can be reduced.

In an embodiment of a second aspect of the invention, the distal end part of the second member has a small-diameter part a predetermined distance away from the distal end toward the root thereof, the elastic member has a through hole extending in the direction of insertion of the second member, an engagement projection projecting from the inner surface of the through hole, and an engagement projection displacing part that, in inserting the engagement projection into the small-diameter part of the second member, displaces the top end of the engagement projection radially outward to reduce the force of insertion of the engagement projection, and the joint structure is so constructed that the first and second members are joined together by inserting and holding the elastic member in the annular frame and inserting the distal end part of the second member into the through hole of the elastic member to fit the engagement projection into the small-diameter part.

With the above structure, when the second member is inserted into the through hole of the elastic member inserted and held in the annular frame of the first member like the above embodiment of the first aspect of the invention, the engagement projection on the inner surface of the through hole is fitted into the small-diameter part of the second member. Further, when the first member holding the elastic member is relatively pulled with a force exceeding a certain limit in the direction of its withdrawal from the second member, the engagement projection is disengaged from the small-diameter part.

Therefore, the first and second members can be detachably joined, not in a way that the elastic member has a shape with an undercut that would be formed where holding the distal end part of the second member to wrap it spherically like in the related art but in a way that it has a through hole. As a result, the production cost of the elastic member can be reduced.

Further, if the engagement projection obtains a large force holding the second member by enhancing the hardness of the elastic member in order to firmly hold the first member in position, the engagement projection displacing part can displace the top end of the engagement projection radially outward in the course of fitting of the engagement projection into the small-diameter part. Thus, the force of insertion of the second member into the through hole can be reduced.

In another embodiment of the first aspect of the invention, the elastic member has an engagement projection displacing part that, in inserting the engagement projection into the small-diameter part of the second member, displaces the top end of the engagement projection radially outward to reduce the force of insertion of the engagement projection.

With this structure, if, like the above embodiment of the second aspect, the hardness of the elastic member is enhanced in order that the elastic member obtains a large force holding the second member, the force of insertion of the second member into the through hole can be reduced.

In a preferred embodiment, the engagement projection displacing part comprises a mass-reduced part formed to displace the top end of the engagement projection of the elastic member radially outward in inserting the engagement projection into the small-diameter part of the second member.

According to this embodiment, when the engagement projection is fitted into the small-diameter part, it can be displaced radially outward without the complication of the structure of the elastic member.

In the preceding embodiments, the end surface of the elastic member toward the root of the second member is preferably formed with a tool engagement part that engages with a tool for holding the elastic member in inserting the elastic member into the annular frame.

According to this embodiment, when the tool is engaged with the tool engagement part and is then used to insert the elastic member into the annular frame of the first member, the elastic member can be easily aligned with the annular frame. This facilitates the insertion of the elastic member into an adequate position of the annular frame.

Preferably, in the preceding embodiments, the annular frame has a hole that is open at the inner surface thereof, the elastic member has a projection that engages with the hole, and the elastic member is held in the annular frame by inserting the elastic member into the annular frame to fit the projection into the hole.

According to this embodiment, the projection of the elastic member engages with the hole of the annular frame. This prevents the circumferential movement of the elastic member and the movement thereof in the direction of extraction (opposite to the direction of insertion). Therefore, the elastic member can be held in the annular frame with stability and reliability.

In the above embodiment, the elastic member preferably has a recess formed in a portion of the outer surface thereof closer to the root of the second member than the projection to displace the top end of the projection radially inward in fitting the projection into the hole.

With this structure, if the hardness of the elastic member is enhanced to increase the force of engagement between the elastic member and the annular frame, it can be avoided that in the course of insertion of the elastic member into the annular frame, the top end of the projection is displaced backward in the direction of insertion of the elastic member to forcefully slide on the inner surface of the annular frame. Thus, the force of insertion of the elastic member into the annular frame can be reduced.

BRIEF DESCRIPTION OF THE DRAWINGS

FIGS. 11A and 11B show a first modification of the embodiment of the invention, FIG. 11A is a corresponding view of FIG. 7B and FIG. 11B is a cross section taken along the line J-J of FIG. 11A.

FIGS. 12A and 12B show a second modification of the embodiment of the invention, FIG. 12A is a corresponding view of FIG. 7B and FIG. 12B is a cross section taken along the line K-K of FIG. 12A.

DETAILED DESCRIPTION OF THE INVENTION

A preferred embodiment of the present invention will be described below with reference to the drawings. The following description of the preferred embodiment is illustrative only and is not intended to limit the scope, applications and use of the invention.

Figure 1A:
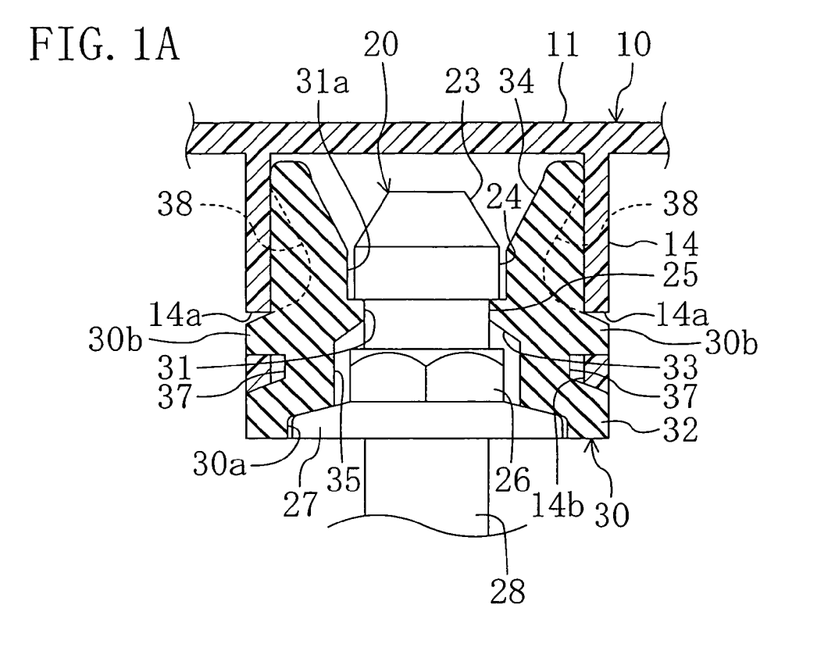
FIG. 1A is a cross section taken along the line A-A of FIG. 2.
Figure 1B:
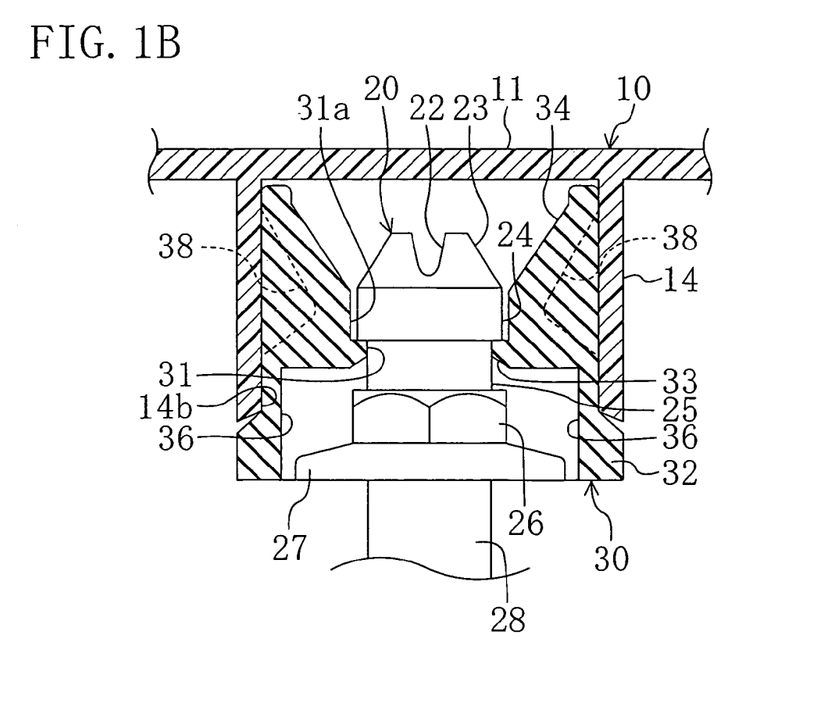
FIG. 1B is a cross section taken along the line B-B of FIG. 2.

FIGS. 1A and 1B show the case where a joint structure between members according to an embodiment of the invention is applied in joining an engine cover (first member) 10 for covering a vehicle engine (not shown) from above to an adapter (second member) 20 attached to the engine.

Figure 2:
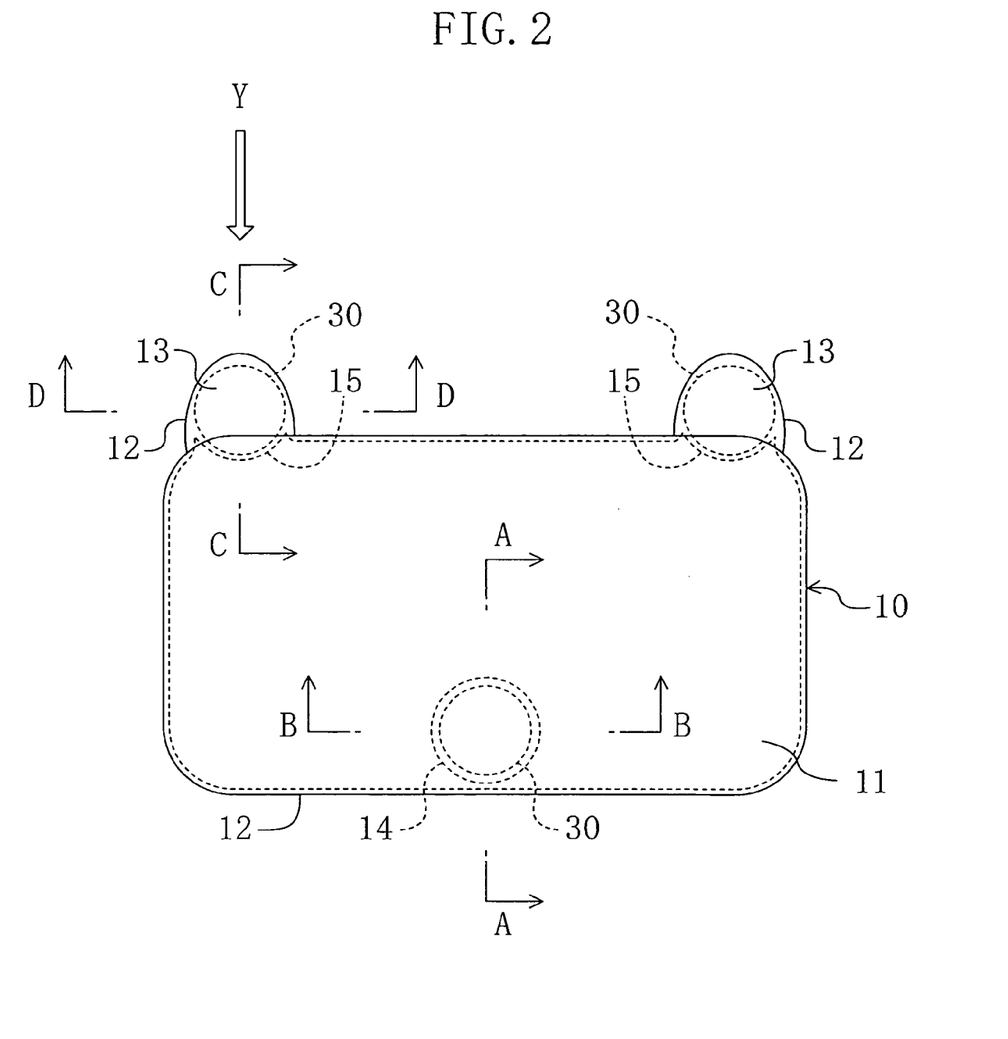
FIG. 2 is a plan view of an engine cover mounted on an engine.
Figure 3:
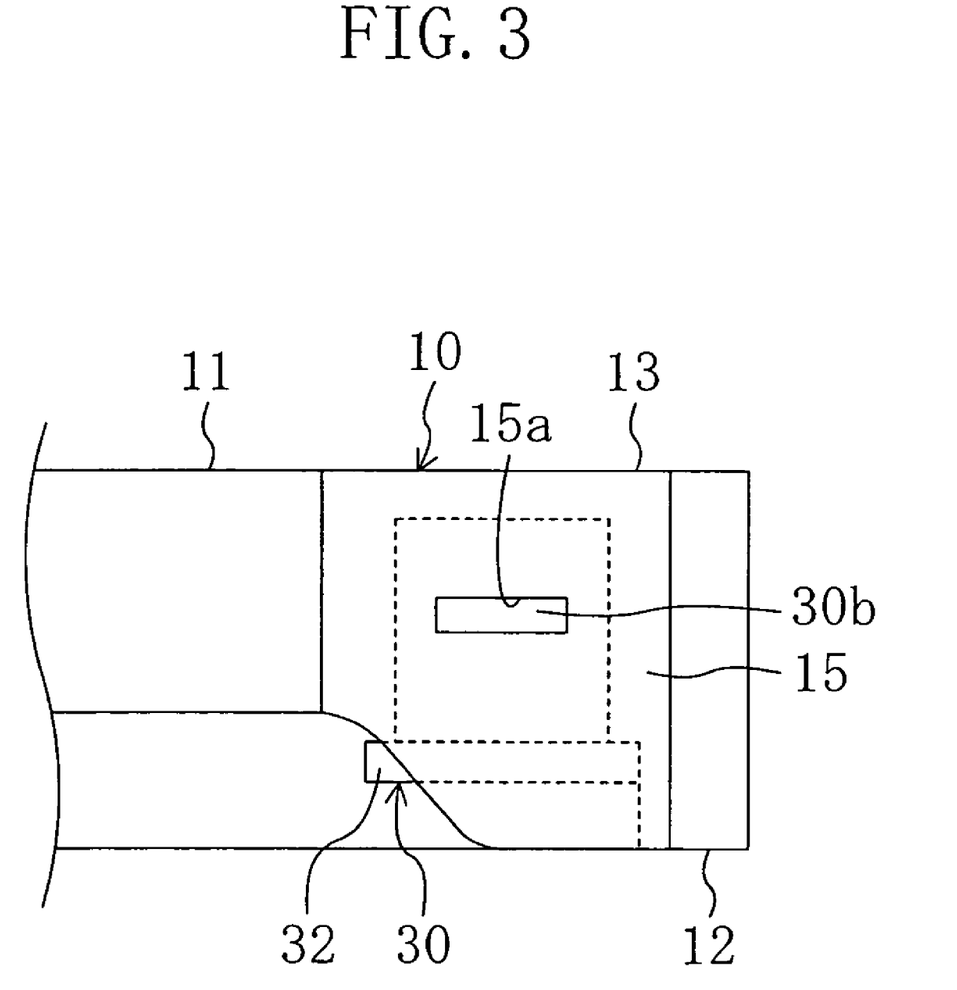
FIG. 3 is an enlarged view of FIG. 2 when viewed in the direction of the arrow Y.

The engine cover 10 is integrally molded from a resin material. As shown in FIG. 2, the engine cover 10 has a flat plate 11 formed substantially in a rectangle in plan view. As shown in FIG. 3, a downwardly extending peripheral wall 12 is formed at the edges of the flat plate 11. The flat plate 11 has, as also shown in FIG. 2, a pair of extensions 13, 13 extending from both ends of one long edge thereof. Parts of the peripheral wall 12 of the flat plate 11 run along the peripheral edges of the extensions 13 and 13, respectively. A total of three positions, including the two extensions 13 and 13 and the vicinity of the middle of the other long edge of the flat plate 11, are the joint positions where the flat plate 11 is joined to adapters 20 through mount rubbers 30 which are elastic members.

A first annular frame 14 extending downward is formed at the joint position located in the vicinity of the middle of said other long edge of the flat plate 11. A mount rubber 30 is inserted into the first annular frame 14. The first annular frame 14 has a circular cross section. As shown in FIG. 1A, the lower part of the first annular frame 14 has two holes 14a and 14a formed about 180 degrees circumferentially apart from each other. Each hole 14a is open at the inner surface of the first annular frame 14 and passes through the first annular frame 14. Further, each hole 14a is formed in a rectangle that extends in the circumferential direction of the first annular frame 14.

Figure 4A:
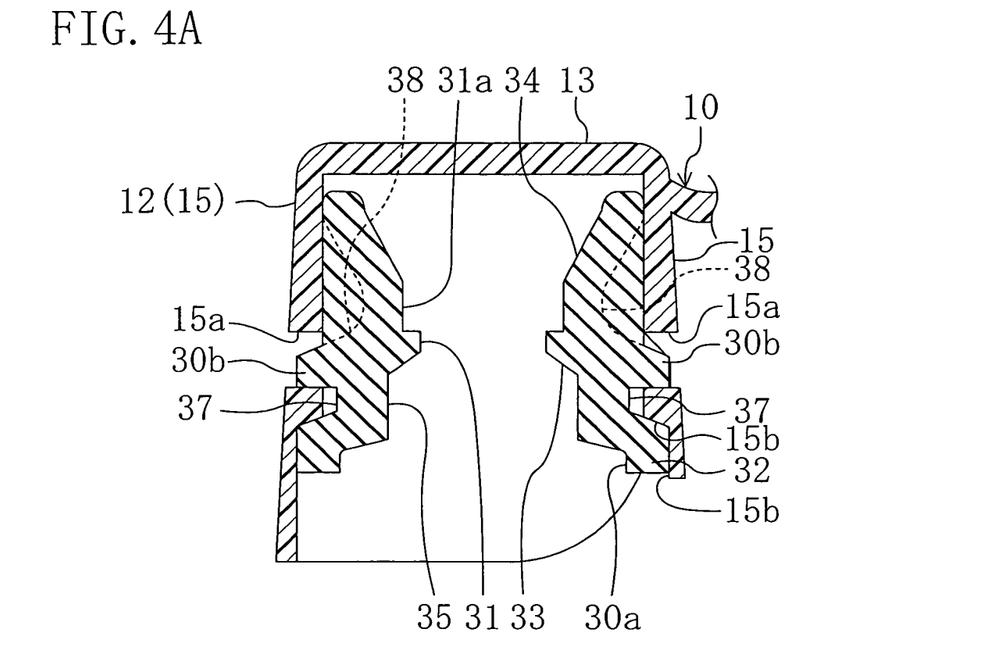
FIG. 4A is a cross section taken along the line C-C of FIG. 2.
Figure 4B:
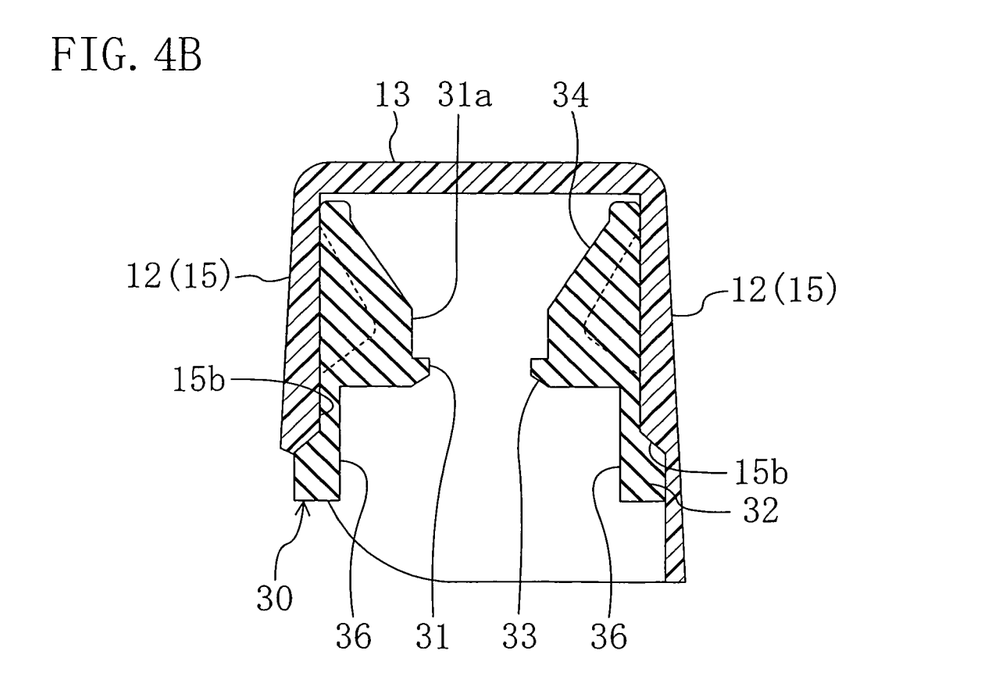
FIG. 4B is a cross section taken along the line D-D of FIG. 2.

Furthermore, second annular frames 15 and 15 similar to the first annular frame 14 are formed at the joint positions where the extensions 13 and 13 are joined to the adapters 20 and 20, respectively. As shown in FIGS. 4A and 4B, the vertical dimension of these second annular frames 15 is selected to be larger than that of the first annular frame 14. A part of the side wall of each second annular frame 15 located within the area of the extension 13, i.e., outside of the flat plate 11, is formed of part of the peripheral wall 12. Further, the lower part of the second annular frame 15 has two holes 15a, likewise the first annular frame 14.

Figure 5:
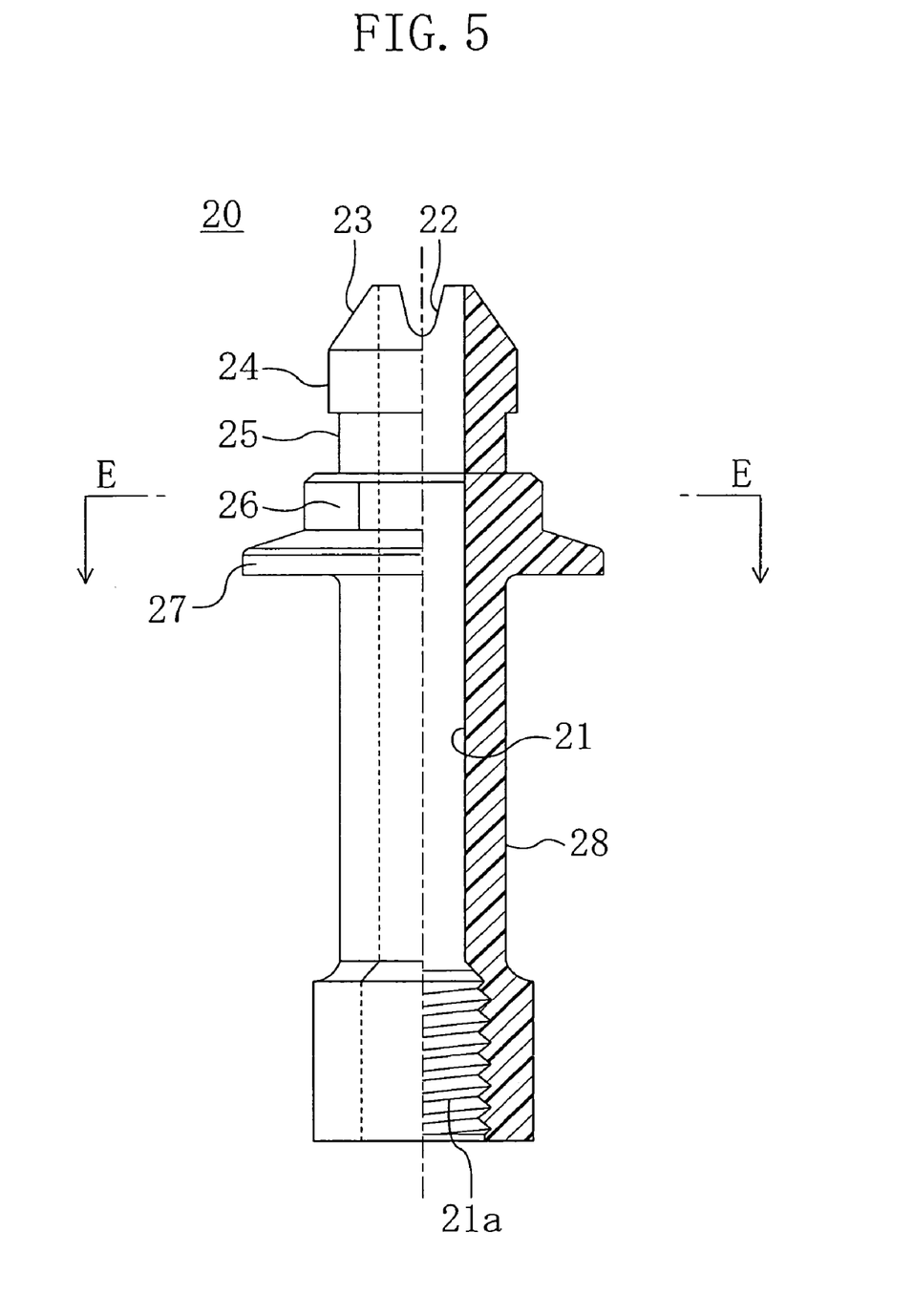
FIG. 5 is a partially cross-sectional view of an adapter when viewed from one side.

As shown in FIG. 5, the adapter 20 is formed by integrally molding a resin material in a vertically extending column. An axial hole 21 of circular cross section is formed at the radial center of the adapter 20 to pass through it vertically. An internally threaded part 21a is formed at the lower end of the inner periphery of the axial hole 21. The internally threaded part 21a is screwed onto an externally threaded part (not shown) of a stud bolt attached to the top of the engine.

Figure 6:
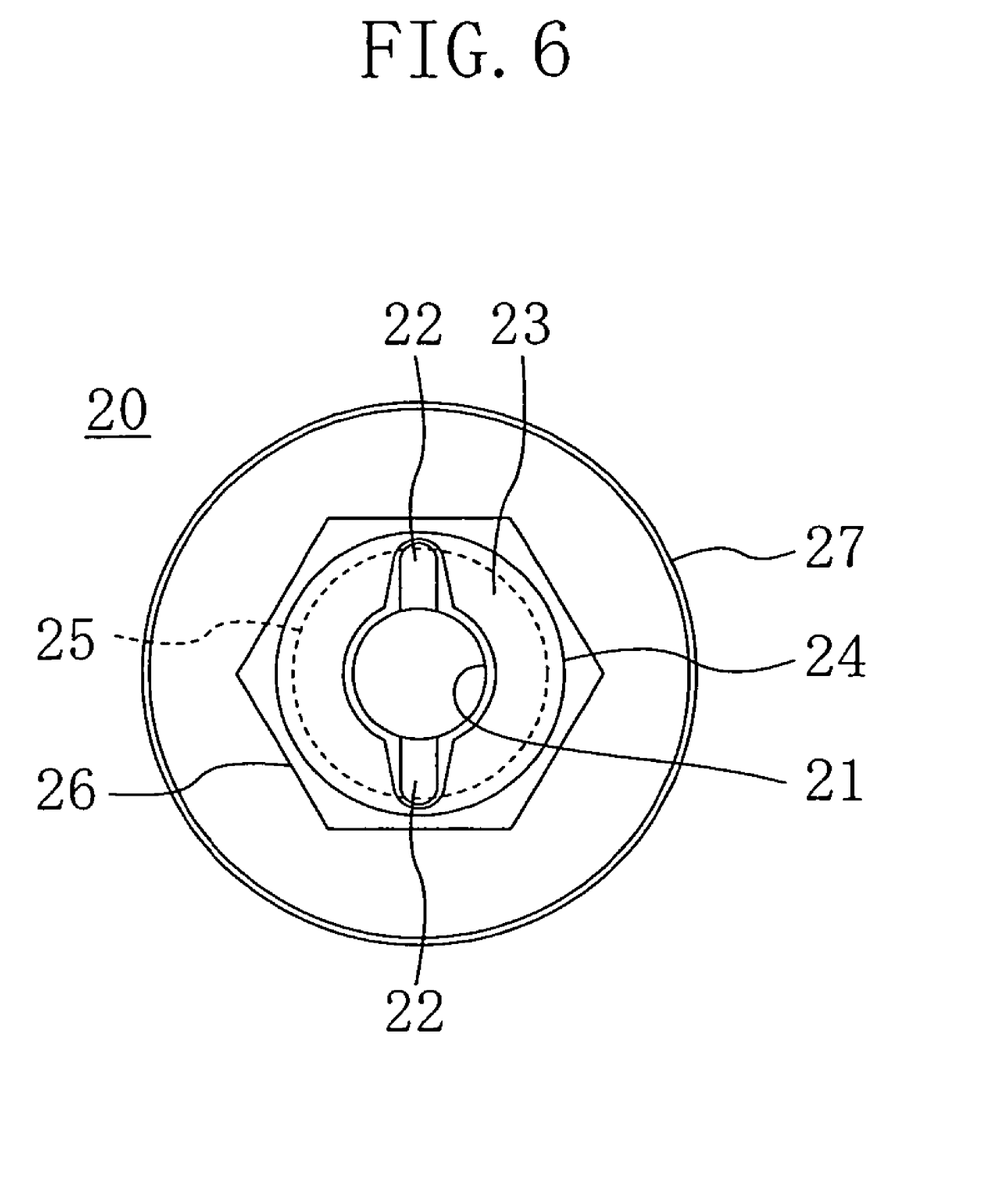
FIG. 6 is a plan view of the adapter.

The top end of the adapter 20 is formed, as shown in FIG. 6, with two cutaways 22, 22 about 180 degrees circumferentially apart from each other. Further, the top end of the adapter 20 is formed in a tapered face 23 that gradually reduces the diameter upward. As shown in FIG. 5, the adapter 20 has a large-diameter part 24 and a small-diameter part 25 formed in this order under the tapered face 23. A step is formed by the large-diameter part 24 and the small-diameter part 25. The adapter 20 also has a hexagonal part 26 formed under the small-diameter part 25 to form a regular hexagon in plan view. The hexagonal part 26 is used to engage a tool (not shown) thereon in screwing the stud bolt into the internally threaded part 21a.

The adapter 20 also has a circular flange 27 formed under the hexagonal part 26 to extend radially outward. The bottom surface of the flange 27 is a flat surface substantially orthogonal to the central axis of the adapter 20. The top surface of the flange 27 is an inclined surface that goes down radially toward the outside of the flange 27.

Figure 7A:
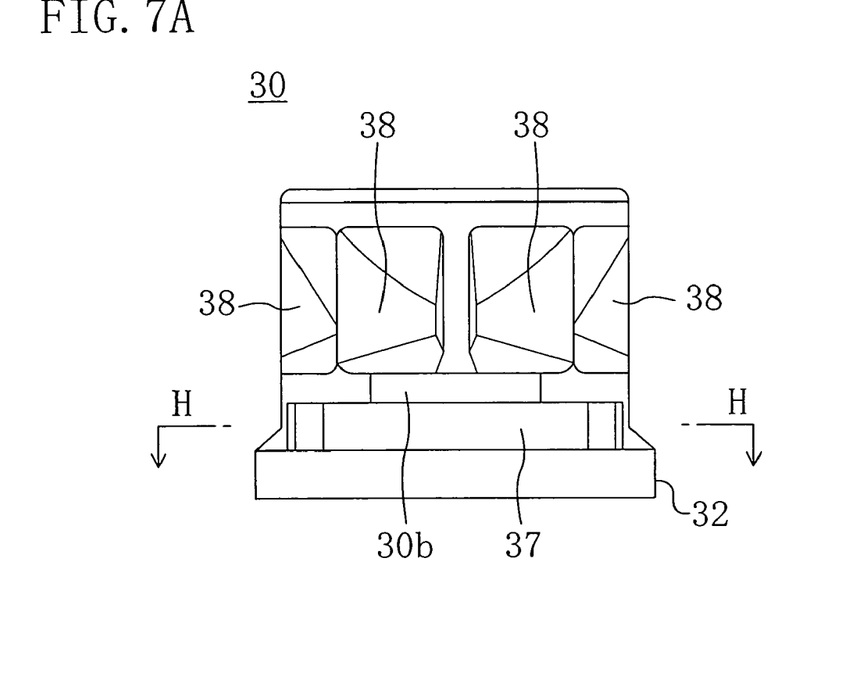
FIG. 7A is a side view of a mount rubber and FIG. 7B is a plan view thereof.
Figure 7B:
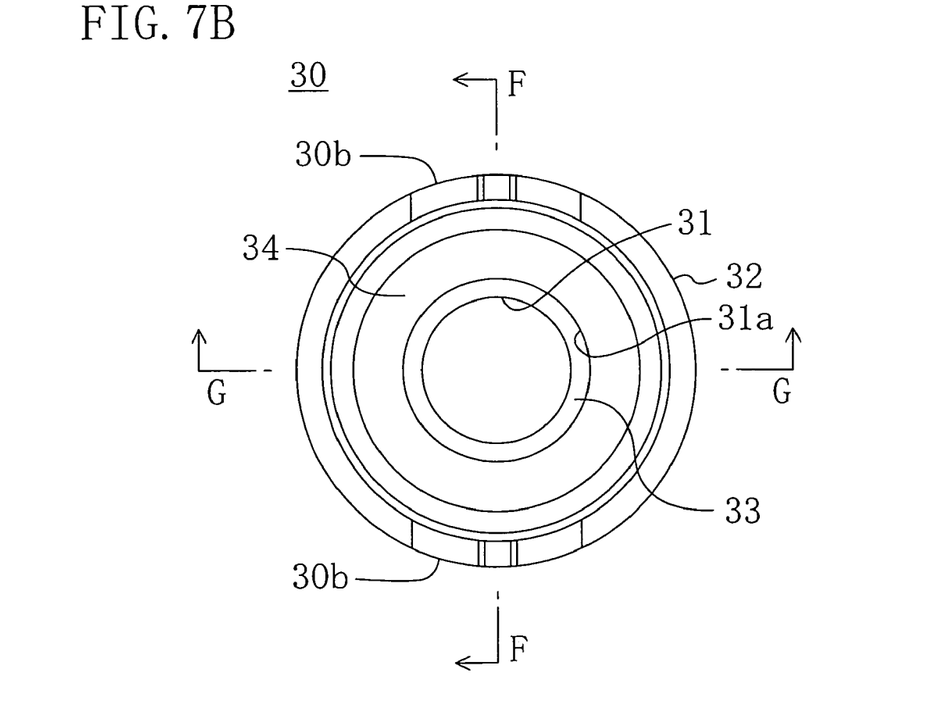

The mount rubber 30 is integrally molded from rubber. The mount rubber 30 to be inserted into the first annular frame 14 has the same shape as the mount rubber 30 to be inserted into the second annular frame 15. As shown in FIGS. 7A and 7B, these mount rubbers 30 have a substantially columnar shape. The outside diameter of each mount rubber 30 is selected to be slightly larger than the inside diameter of the first and second annular frames 14 and 15. Thus, the mount rubbers 30 can be pressed into the first and second annular frames 14 and 15.

Figure 8A:
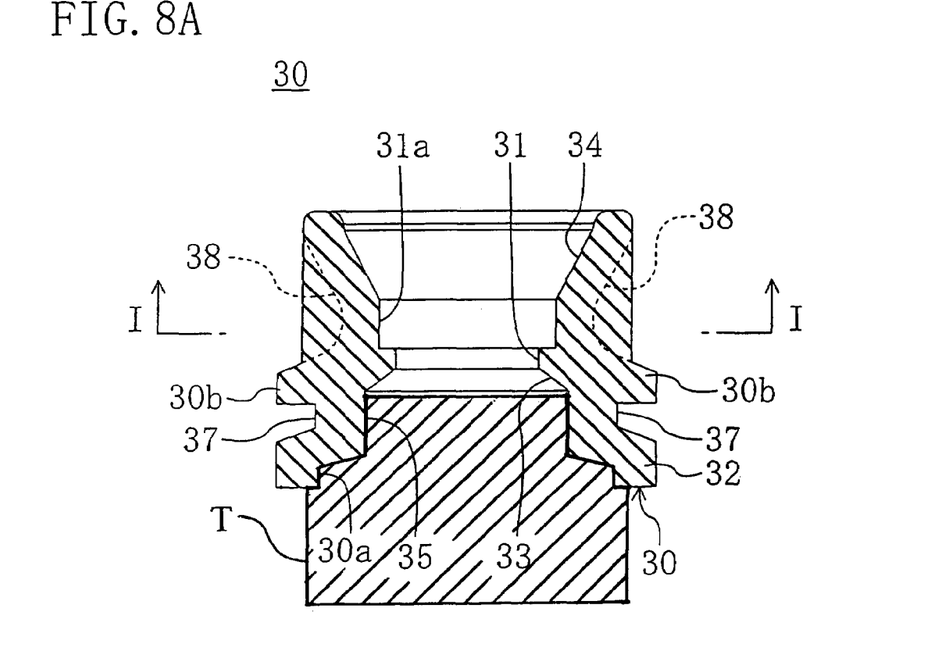
FIG. 8A is a cross section taken along the line F-F of FIG. 7B.
Figure 8B:
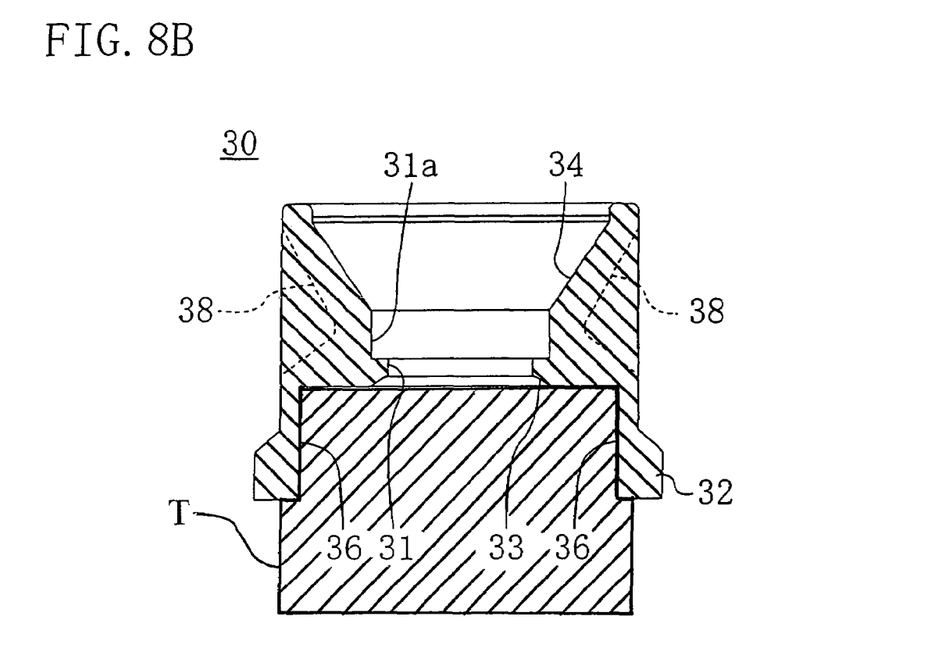
FIG. 8B is a cross section taken along the line G-G of FIG. 7B.

As shown in FIGS. 8A and 8B, the radial center of the mount rubber 30 is formed with a through hole 31 passing through the mount rubber 30 vertically. The adapter 20 is inserted from its top end into the through hole 31. The vertical dimension of the mount rubber 30 is selected to be larger than that of the first annular frame 14. Therefore, as shown in FIGS. 1A and 1B, the bottom end of the mount rubber 30 extends downward beyond the bottom end of the first annular frame 14 to expose itself from the opening located at the bottom end of the first annular frame 14. The bottom end of the mount rubber 30 is formed with a rib 32 that protrudes radially outward and extends circumferentially. The rib 32 of the mount rubber 30 abuts on the bottom end of the first annular frame 14 with the mount rubber 30 inserted in the first annular frame 14.

As shown in FIGS. 4A and 4B, a shoulder 15b is formed in the vicinity of the bottom end of the second annular frame 15. The rib 32 of the mount rubber 30 abuts on the shoulder 15b. The bottom end of the mount rubber 30 is exposed from the opening located at the bottom end of the second annular frame 15 with the rib 32 abutting on the shoulder 15b.

The vertical middle of the inner surface of the through hole 31 is formed with an engagement projection 33 that protrudes radially inward. The engagement projection 33 is circumferentially continuous. As shown in FIG. 7B, in the radial center of the mount rubber 30, a circular opening is defined by the annular top end surface of the engagement projection 33. The diameter of the opening is selected to be substantially equal to that of the small-diameter part 25 of the adapter 20, so that the top end of the engagement projection 33 can be fitted into the small-diameter part 25 of the adapter 20. As shown in FIGS. 8A and 8B, a circumferential part 31a extending along the central axis of the through hole 31 is formed in a portion of the inner surface of the mount rubber 30 just above the engagement projection 33. The top end of the circumferential part 31a is contiguous with a tapered part 34 that gradually increases the diameter upward. On the other hand, in a portion of the inner surface of the mount rubber 30 just below the engagement projection 33, a large-diameter part 35 is formed which has a slightly larger diameter than the outside diameter of the hexagonal part 26 of the adapter 20. Thus, the hexagonal part 26 of the inserted adapter 20 is positioned inside of the large-diameter part 35. Further, the bottom end of the mount rubber 30, i.e., the end thereof toward the root 28 of the adapter 20, is formed with a circular recess 30a that receives the flange 27 of the adapter 20 when the adapter 20 is inserted into the through hole 31. The lower end of the large-diameter part 35 is open at the radial center of the inside surface of the recess 30a. Thus, as shown in FIG. 1A, the top of the flange 27 abuts on a portion of the inside surface of the recess 30a surrounding the opening of the large-diameter part 35.

Figure 9A:
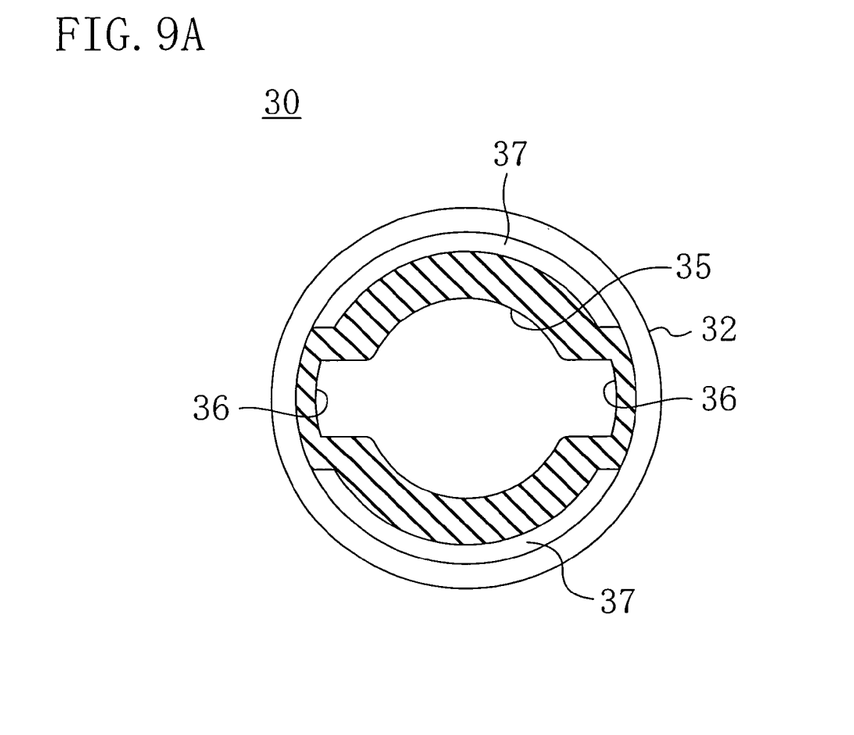
FIG. 9A is a cross section taken along the line H-H of FIG. 7A.

As shown in FIG. 9A, the end of the mount rubber 30 toward the root of the adapter 20 is formed with tool engagement parts 36 into which a tool T shown in F*igure* 8A and 8B is fitted for use in inserting the mount rubber 30 into the annular frame 14 or 15. As also shown in FIGS. 8A and 8B, the tool engagement parts 36 are recesses formed at two positions of the inner surface of the large-diameter part 35 about 90 degrees circumferentially apart from the below-described projections 30b and 30b, respectively, and about 180 degrees circumferentially apart from each other. The mount rubber 30 is held by the tool with the top of the tool fitted into the two recesses.

As shown in FIGS. 7A, 7B and 8A, in a vertically middle portion of the outer surface of the mount rubber 30 between the large-diameter part 35 and the engagement projection 33, projections 30b and 30b are formed which are engageable into the holes 14a and 14a, respectively, of the first annular frame 14 or the holes 15a and 15a, respectively, of the second annular frame 15. Furthermore, two recesses 37 and 37 are formed in a portion of the outer surface of the mount rubber 30 located closer to the root 28 of the adapter 20 than the projections 30b and 30b so as to correspond to the projections 30b and 30b, respectively, and to be circumferentially apart from each other. As also shown in FIG. 9A, these recesses 37 and 37 have the shapes of grooves that circumferentially extend to skirt portions of the outer surface of the mount rubber 30 corresponding to the tool engagement parts 36 and 36. In fitting the projections 30b and 30b into the holes 14a and 14a of the first annular frame 14 or the holes 15a and 15a of the second annular frame 15, as the mount rubber 30 is being inserted into the first or second annular frame 14 or 15, the projections 30b and 30b slide on the inner surface of the first or second annular frame 14 or 15 while being pressed radially inward by the inner surface of the annular frame 14 or 15, so that they are pressed backward in the direction of insertion. In this embodiment, since the recesses 37 are formed in the portion of the outer surface of the mount rubber 30 backward in the direction of insertion to correspond to the projections 30b, the top ends of the projections 30b are easily displaced radially inward and toward the associated recesses 37.

Figure 9B:
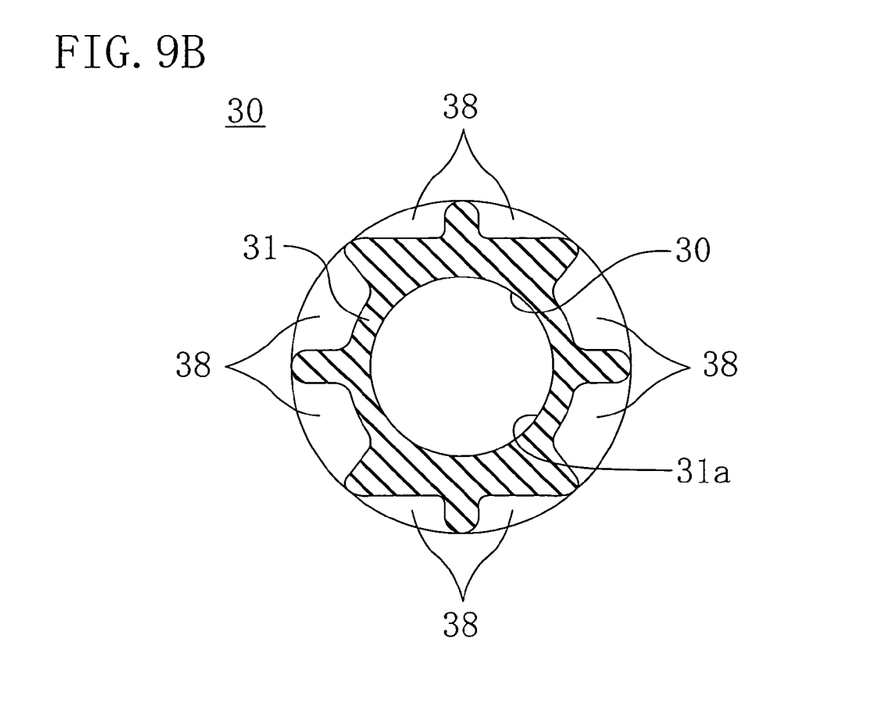
FIG. 9B is a cross section taken along the line I-I of FIG. 8A.

As also shown in FIG. 9B, in a portion of the outer surface of the mount rubber 30 above the projections 30b, a plurality of mass-reduced parts 38 are formed circumferentially spaced apart from one another. As the adapter 20 is being inserted into the through hole 31 until the engagement projection 33 is fitted into the small-diameter part 25, the mass-reduced parts 38 facilitate the displacement of the top of the engagement projection 33 toward the outer periphery of the mount rubber 30. The mass-reduced parts 38 are formed in the outer surface of the mount rubber 30 to indent radially inwardly in a substantially rectangular form. These mass-reduced parts 38 constitute an engagement projection displacing part of the present invention.

Figure 10:
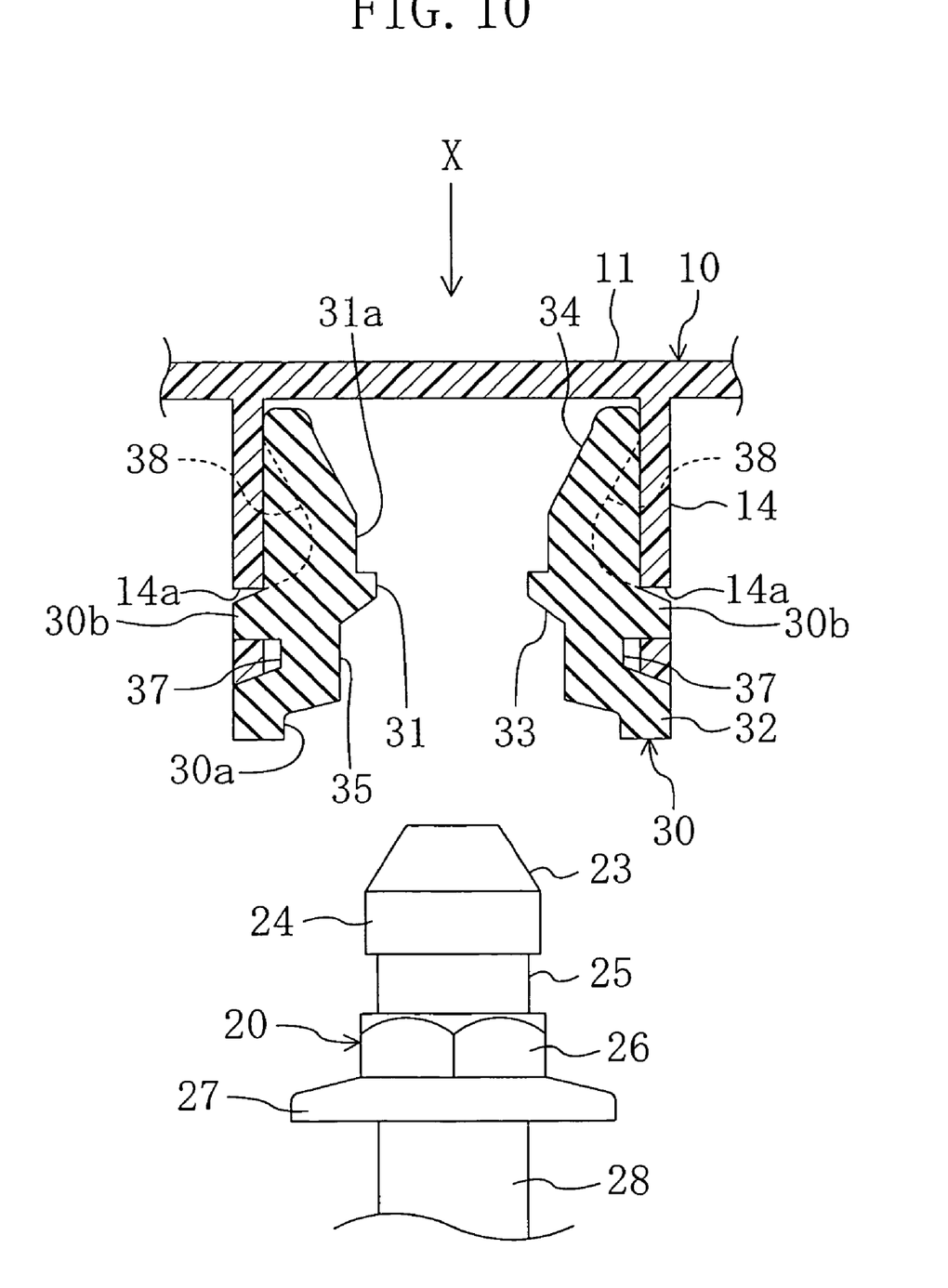
FIG. 10 is a corresponding view of FIG. 1A showing the adapter before inserted into the mount rubber.

Next, the manner of joining of the engine cover 10 to each adapter 20 will be described. First, one mount rubber 30 is accommodated into the first annular frame 14 of the engine cover 10. In this case, the mount rubber 30 is held by a tool by fitting the tool into the tool engagement parts 36, and the tool is used to gradually insert the mount rubber 30 into the first annular frame 14 through its opening 14b with the projections 30b of the mount rubber 30 aligned with the holes 14a of the first annular frame 14. In the course of insertion of the mount rubber 30 into the first annular frame 14, the projections 30b of the mount rubber 30 are easily displaced toward the recesses 37. Then, as shown in FIG. 10, the rib 32 of the mount rubber 30 abuts on the edge of the insert opening of the first annular frame 14 to restrain further movement of the mount rubber 30 in the direction of insertion, and concurrently the projections 30b are fitted into the holes 14a of the first annular frame 14 so that the mount rubber 30 is completely inserted and held in the first annular frame 14. Likewise, as shown in FIGS. 4A and 4B, in the course of insertion of each of two mount rubbers 30 into the associated second annular frame 15 through its opening, the rib 32 of the mount rubber 30 abuts on the shoulder 15b of the second annular frame 15 and concurrently the projections 30b are fitted into the holes 15a of the second annular frame 15 so that the mount rubber 30 is completely inserted and held in the second annular frame 15. In this manner, the mount rubbers 30 can be held in the first and second annular frames 14 and 15 with stability and reliability against their circumferential movement and movement in the direction of exit (extraction from the first and second annular frames 14 and 15).

Thereafter, the engine cover 10 is moved so that the top ends of the adapters 20 are located below the through holes 31 of the associated mount rubbers 30. Next, when the engine cover 10 is pushed down as shown in the arrow X in FIG. 10, each adapter 20 is inserted from its top end into the through hole 31. In this case, when the large-diameter part 24 of the adapter 20 reaches the engagement projection 33, the top end of the engagement projection 33 is displaced toward the outer periphery of the mount rubber 30 by the effect of the mass-reduced parts 38. Thus, the force of insertion of the adapter 20 into the through hole 31 can be reduced. As shown in FIGS. 1A and 1B, when the adapter 20 is further inserted into the mount rubber 30, the engagement projection 33 is fitted into the small-diameter part 25 to restrain the exit of the adapter 20 backward in the direction of insertion (opposite to the direction of insertion) and concurrently the flange 27 of the adapter 20 abuts on the recess 30a to prevent further movement of the adapter 20 in the direction of insertion.

On the other hand, in separating the engine cover 10 from the adapter 20, the engine cover 10 is lifted up to extract the adapter 20 from the through hole 31 of the mount rubber 30. In this case, as the engagement projection 33 of the mount rubber 30 rides on the large-diameter part 24, it elastically deforms to fully disengage from the small-diameter part 25. In this manner, the engine cover 10 is separated from the adapter 20.

In this case, since each of the mount rubbers 30 is engaged with the first or second annular frames 14 or 15, each at two positions, i.e., the projections 30b and the rib 32, the mount rubbers 30 can be prevented from being extracted from the first and second annular frames 14 and 15 prior to the disengagement from the adapters 20.

As described above, in the present embodiment, each mount rubber 30 with a through hole 31 is inserted and held in an associated one of the first and second annular frames 14 and 15 of the engine cover 10 and the associated adapter 20 is inserted into the through hole 31 of the mount rubber 30 to fit the engagement projection 33 into the small-diameter part 25. Since, thus, the through hole 31 is formed in the mount rubber 30 unlike the related art in which the mount rubber has a shape with an undercut that would be formed where holding the top end of the adapter 20 to wrap it spherically, the engine cover 10 can be joined detachably to the adapter 20 and can be held in position. Therefore, the need for employing a slide core as part of a mold for the mount rubber 30 is eliminated, resulting in reduced cost of the mount rubber 30.

Further, the mount rubber 30 is formed with an engagement projection displacing part for reducing the force of insertion of the adapter 20 into the rubber mount 30. Therefore, if the hardness of the mount rubber 30 is enhanced in order to securely hold the engine cover 10 on the adapter 20, the force of insertion of the adapter 20 into the through hole 31 can be reduced. This facilitates the assembly work of the engine cover 10.

Furthermore, since the engagement projection displacing part is formed of mass-reduced parts 38, this prevents the structure of the mount rubber 30 from being complicated, resulting in reduced cost of the mount rubber 30 and facilitated assembly work of the engine cover 10.

Furthermore, tool engagement parts 36 are formed in the end surface of each mount rubber 30 located backward in the direction of insertion, so that the mount rubber 30 can inserted into the first or second annular frame 14 or 15 after it is held at its tool engagement parts 36 by a tool. This eliminates the need for checking the positions of the projections 30b in inserting the mount rubber 30 in the annular frame 14 or 15. Therefore, the workability of assembly of the mount rubber 30 with the engine cover 10 can be improved.

Furthermore, the mount rubber 30 is formed with recesses 37 so that the top ends of the projections 30b can be displaced radially inward and toward the recesses 37 in inserting the mount rubber 30 into the annular frame 14 or 15. Therefore, it can be avoided that the projections 30b forcefully slide on the inner surface of the annular frame 14 or 15. Further, the increase in the insertion force can be thereby suppressed, which facilitates the insertion of the mount rubber 30 into the annular frame 14 or 15. As a result, the workability of assembly of the mount rubber 30 with the annular frame 14 or 15 can be improved.

Figure 11A:
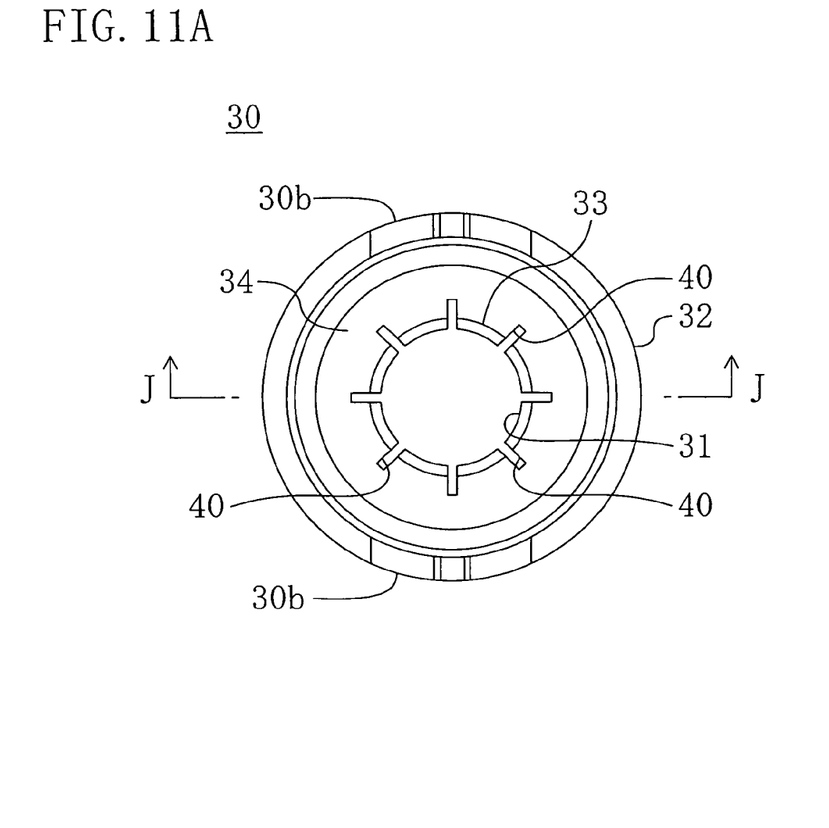
Figure 11B:
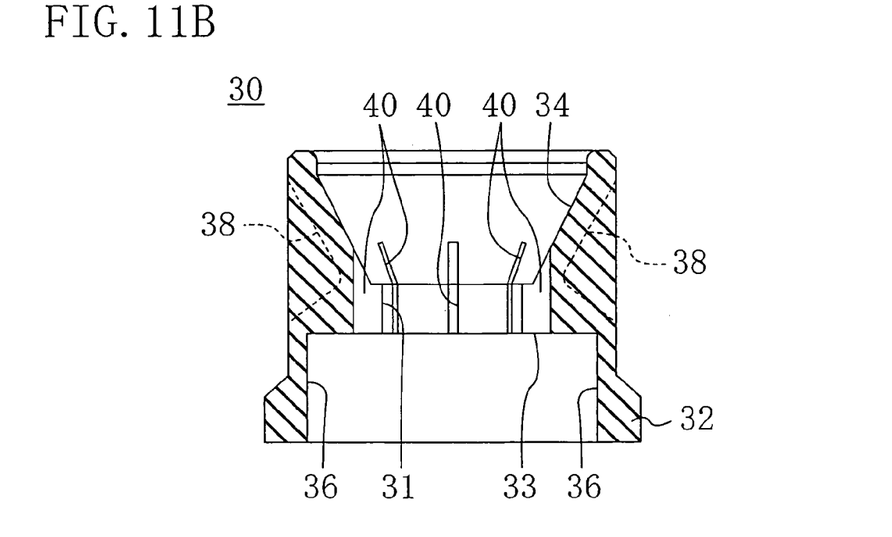

In the above embodiment, the mass-reduced parts 38 for reducing the insertion force are formed in the outer surface of the mount rubber 30. For example, as in a first modification of the above embodiment shown in FIGS. 11A and 11B, such mass-reduced parts may be composed of a plurality of slots 40 formed in the inner surface of the through hole 31. The slots 40 are cut in radially outwardly from the top end of the engagement projection 33 and are circumferentially spaced at regular intervals. In this case, when the adapter 20 is inserted into the through hole 31 so that the large-diameter part 24 reaches the engagement projection 33, the engagement projection 33 is entirely displaced depthwise of the slots 40. At the time, the top end of the engagement projection 33 is displaced toward the outer periphery of the mount rubber 30, i.e., displaced to increase the inside diameter of the engagement projection 33. This decreases the force of insertion of the adapter 20 into the through hole 31.

Figure 12A:
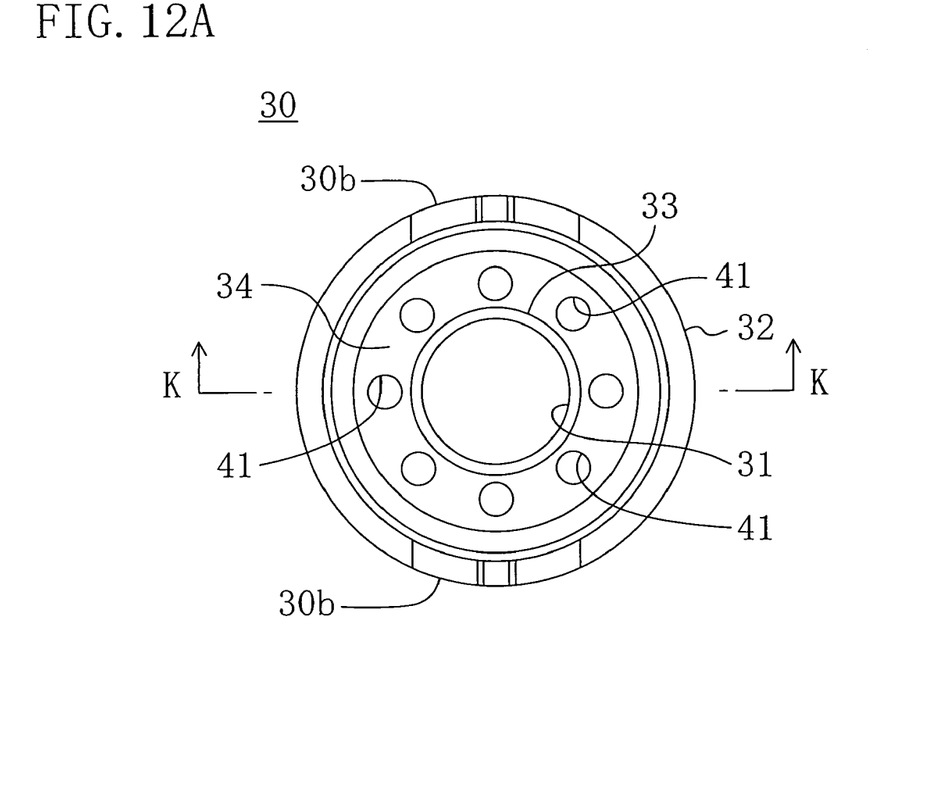
Figure 12B:
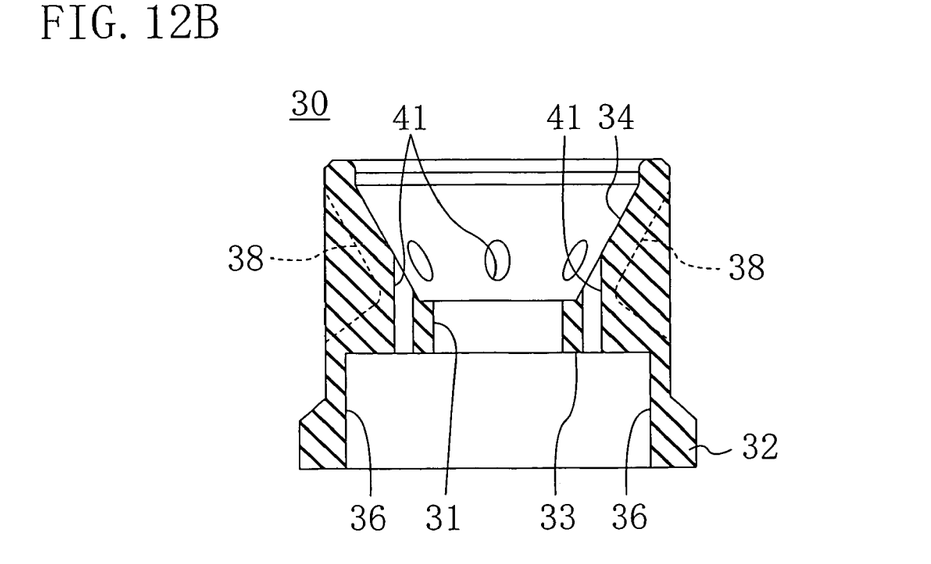

Alternatively, as in a second modification of the above embodiment shown in FIGS. 12A and 12B, a plurality of holes 41 extending vertically (along the through hole 31) may be formed in the mount rubber 30 at circumferentially spaced points radially outward apart from the top end of the engagement projection 33 to constitute mass-reduced parts for reducing the insertion force. In this case, when the adapter 20 is inserted into the through hole 31 so that the large-diameter part 24 reaches the engagement projection 33, the holes 41 are squashingly deformed. Thus, the top end of the engagement projection 33 is displaced toward the outer periphery of the mount rubber 30. This decreases the force of insertion of the adapter 20 into the through hole 31.

In the first and second modifications, even if the center of the through hole 31 of the mount rubber 30 inserted in the annular frame 14 or 15 is misaligned with the center of the adapter 20 mounted on the engine, the engagement projection 33 is displaced so that the adapter 20 can be inserted into the mount rubber 30 with ease.

In the first and second modifications, the mass-reduced parts 38 in the outer periphery of the mount rubber 30 may be dispensed with.

The shape of each mass-reduced part is not limited to that in the above embodiment and modifications.

Further, the present invention is applicable to other cases than where the engine cover 10 is joined to the adapter 20.

INDUSTRIAL APPLICABILITY

As can be seen from the above, the joint structure between members according to the present invention can be used such as where an engine cover is mounted on an engine.

What is claimed is:

1. A joint structure between members in which an elastic member is inserted and held in an annular frame provided on a first member and the first member is joined to a second member having a distal end of columnar shape through the elastic member by inserting the distal end of the second member into the elastic member, wherein the distal end of the second member has a distal end face, a large diameter part and a small-diameter part forming a recessed portion at the distal end of the second member, said large diameter part being closer to the distal end than said small diameter part with said small diameter part being spaced a predetermined distance away from the distal end face toward a root of said second member, and a flange closer to the root than the small-diameter part and extending radially outward, the elastic member has a through hole extending in the direction of insertion of the second member and an engagement projection projecting from the inner surface of the through hole, and the joint structure is so constructed that the first and second members are joined together by inserting and holding the elastic member in the annular frame and inserting the distal end of the second member into the through hole of the elastic member to fit the engagement projection into the recessed portion and bring the flange into abutment with an end surface of the elastic member located toward the root of the second member, wherein the large diameter part of the second member is located in the through hole of the elastic member, and an outer surface of the large diameter part is surrounded by the elastic member.

2. The joint structure between members of claim 1, wherein;

the annular frame has a hole that is open at an inner surface thereof, the elastic member has a projection that engages with the hole, the elastic member is held in the annular frame by inserting the elastic member into the annular frame to fit the projection into the hole, and the elastic member has a recess formed in a portion of an outer surface thereof closer to the root of the second member than the projection to displace a top end of the projection radially inward in fitting the projection into the hole.

3. The joint structure between members of claim 1, wherein the elastic member has an engagement projection displacing part that, in inserting the engagement projection into the small-diameter part of the second member, displaces a top end of the engagement projection radially outward to reduce the force of insertion of the engagement projection; and the joint structure is so constructed that the first and second members are joined together by inserting and holding the elastic member in the annular frame and inserting the distal end pan of the second member into the through hole of the elastic member to fit the engagement projection into the small-diameter part, wherein the engagement projection displacing part further includes at least one hole formed in said inner surface of the through hole formed in the elastic member so that, when the large diameter part reaches the engagement projection, the hole is squashingly deformed such that the engagement projection is displaced toward the outer periphery of the mount rubber and thus decreases the force of insertion of the second member into the through hole.

4. The joint structure between members of claim 1, wherein the elastic member has an engagement projection displacing part that, in inserting the engagement projection into the small-diameter part of the second member, displaces a top end of the engagement projection radially outward to reduce the force of insertion of the engagement projection; and the engagement projection displacing part further includes at least one cut formed in said inner surface of the through hole formed in the elastic member such that, when the large-diameter part reaches the engagement projection, the engagement projection is entirely displaced depthwise of the cut so as to decrease the force of insertion of the second member into the through hole.

5. A joint structure between members in which an elastic member is inserted and held in an annular frame provided on a first member and the first member is joined to a second member of columnar shape having a distal end through the elastic member by inserting the distal end of the second member into the elastic member, wherein the distal end of the second member has a small-diameter part a predetermined distance away from the distal end toward a root thereof, the elastic member has a through hole extending in the direction of insertion of the second member, an engagement projection projecting from an inner surface of the through hole, and an engagement projection displacing part that, in inserting the engagement projection into the small-diameter part of the second member, displaces a top end of the engagement projection radially outward to reduce the force of insertion of the engagement projection, the joint structure is so constructed that the first and second members are joined together by inserting and holding the elastic member in the annular frame and inserting the distal end pan of the second member into the through hole of the elastic member to fit the engagement projection into the small-diameter part; and the engagement projection displacing part further includes at least one cut formed in said inner surface of the through hole formed in the elastic member such that, when the large-diameter part reaches the engagement projection, the engagement projection is entirely displaced depthwise of the cut so as to decrease the force of insertion of the second member into the through hole.

6. The joint structure between members of any one of claims 1 to 4, wherein the end surface of the elastic member toward the root of the second member is formed with a tool engagement part that engages with a tool for holding the elastic member in inserting the elastic member into the annular frame.

7. The joint structure between members of claim 5 or 4, wherein a plurality of cuts are formed in said inner surface of the through hole, and the cuts extend substantially in a direction of insertion of said second member.

8. A joint structure between members in which an elastic member is inserted and held in an annular frame provided on a first member and the first member is joined to a second member of columnar shape having a distal end through the elastic member by inserting the distal end of the second member into the elastic member, wherein the distal end of the second member has a small-diameter part a predetermined distance away from the distal end toward a root thereof, the elastic member has a through hole extending in the direction of insertion of the second member, an engagement projection projecting from an inner surface of the through hole, and an engagement projection displacing part that, in inserting the engagement projection into the small-diameter part of the second member, displaces a top end of the engagement projection radially outward to reduce the force of insertion of the engagement projection; and the joint structure is so constructed that the first and second members are joined together by inserting and holding the elastic member in the annular frame and inserting the distal end pan of the second member into the through hole of the elastic member to fit the engagement projection into the small-diameter part, wherein the engagement projection displacing part further includes at least one hole formed in said inner surface of the through hole formed in the elastic member so that, when the large diameter part reaches the engagement projection, the hole is squashingly deformed such that the engagement projection is displaced toward the outer periphery of the mount rubber and thus decreases the force of insertion of the second member into the through hole.

9. The joint structure between members of claim 8 or 3, wherein a plurality of holes are formed in said inner surface of the through hole, and the holes extend substantially in a direction of insertion of said second member.

* * * * *